Jan. 9, 1968 R. C. BEDINGFIELD 3,363,113

SAMPLE AND HOLD CIRCUIT USING AN OPERATIONAL AMPLIFIER AND A HIGH IMPEDANCE BUFFER CONNECTED BY A SWITCHED DIODE CAPACITOR CIRCUIT

Filed Aug. 2, 1965 2 Sheets-Sheet 1

INVENTOR
R. C. BEDINGFIELD
BY John K. Mulkerney
ATTORNEY

United States Patent Office 3,363,113

Patented Jan. 9, 1968

3,363,113

SAMPLE AND HOLD CIRCUIT USING AN OPERATIONAL AMPLIFIER AND A HIGH IMPEDANCE BUFFER CONNECTED BY A SWITCHED DIODE CAPACITOR CIRCUIT

Robert C. Bedingfield, Greensboro, N.C., assignor to Bell Telephone Laboratories, Incorporated, New York, N.Y., a corporation of New York Filed Aug. 2, 1965, Ser. No. 476,395
8 Claims. (Cl. 307—238)

ABSTRACT OF THE DISCLOSURE

A sample and hold circuit using an input operational amplifier, an output high impedance buffer and a switching diode capacitor circuit connected between the amplifier and the buffer. Normally the capacitor is discharged through a switching circuit so that the output of the buffer is a reproduction of the analog input signal. When it is desired to sample and hold the input signal a hold command pulse is applied to the switch and to the input of the operational amplifier to open the switch, thereby removing the discharge path and at the same time opening the circuit between the capacitor and the input amplifier. Thus, during the hold command pulse the capacitor has no discharge path and holds the value present when the hold command pulse is applied.

This invention relates to an analog signal, sample and hold circuit.

In the typical sample and hold circuit an input analog signal is continuously sampled and applied through a transmission gate to a storage device, e.g., a capacitor. At an appropriate point in time the transmission gate is turned off and the hold period begins; during this hold period the output of the storage device should preferably remain equal to the amplitude of the sampled analog signal at the instant of transmission gate turn-off.

During the hold period the analog output of the storage device is generally utilized to generate intelligence that is equivalent to the sampled analog signal. In a pulse code modulation system, for instance, such an analog output is converted to an equivalent binary code.

The classical sample and hold circuit utilizes, for the aforementioned transmission gate, a bilateral Lewis-type diode gate, e.g., see the article entitled "A Precision Sample and Hold Circuit with Subnanosecond Switching" by Gray and Kitsopoulos, IEEE Transactions on Circuit Theory, vol. CT–11, September 1964.

The design effort in this area has been directed principally toward improvement of the classical Lewis-type transmission gate. Careful selection of components, exact matching of gating diodes, and specially designed gating drive circuits have all led to improved sample and hold operation. Nevertheless there still exist inherent disadvantages in this type prior art circuit. A major disadvantage is that the bias current through the Lewis gate must be several times greater than the analog signal current so that the diodes remain in a linear region. And the large amount of bias current necessarily requires a hold pulse amplitude greater than the signal current. Also, hold pulses must be applied to both sides of the Lewis gate at precisely the same time and one must be an exact inverted reproduction of the other if accuracy is to be maintained.

It is, accordingly, an object of the present invention to circumvent the above disadvantages by providing a sample and hold circuit that does not require a bilateral gate to permit the holding of a sampled analog signal.

It is a further object of the invention to achieve a sample and hold operation using a low amplitude, unipolar hold command pulse.

A still further object is to achieve a sample and hold operation having high output linearity even though utilizing inherently nonlinear circuit components.

In still other electrical apparatus it is necessary to determine (i.e., sample) the peak value reached by an analog signal in a given time interval. The peak value generally must then be converted to an equivalent binary code for processing, for example, in a digital computer. Where these analog signals are of very high frequency, it is usually necessary to not only detect the existence of the peak but to also hold its magnitude for a period of time sufficient to enable data processing equipment to convert the peak value to the equivalent binary code.

It is accordingly still another object of the invention to determine (i.e., sample) the peak value reached by an analog signal in a given time interval and to hold this value for a specified period of time.

A further object of the invention is to provide a circuit which by means of a simple switching operation can perform either the conventional sample and hold function or, alternatively, a peak detection function.

An analog signal, sample and hold circuit constructed in accordance with the present invention comprises an input operational amplifier and an output high impedance buffer with a diode-capacitor circuit connected therebetween. An over-all degenerative feedback path assures a linear output signal even though the diode-capacitor circuit would normally tend to introduce nonlinearity. The holding action is obtained by a transistorized "switch" electrically connected in parallel with the capacitor to normally provide a discharge path for the same. When holding action is desired, a unipolar hold command pulse of selected polarity is applied to the transistor switch and to the input of the operational amplifier with the result that the transistor switch is open-circuited (i.e., cut-off) and the aforementioned diode back-biased. Thus, during the hold command pulse period the capacitor has no discharge path other than the high impedance buffer and hence it holds the value present when the hold command was applied. Upon termination of the hold command pulse, the capacitor is free to discharge through the transistor switch and the circuit once again functions as an operational amplifier.

It is a feature of the present invention that this sample and hold circuit can be readily adapted to achieve a peak detection mode of operation. To this end, a second "switch" is utilized to prevent the aforementioned application of the hold command pulse to the input of the operational amplifier. In this operational mode, the capacitor samples and holds the maximum value of the input analog signal that occurs during the hold command pulse period.

Other objects and features of the present invention will be more readily undersood from the following detailed description taken in conjunction with the accompanying drawings in which.

Figure 1:
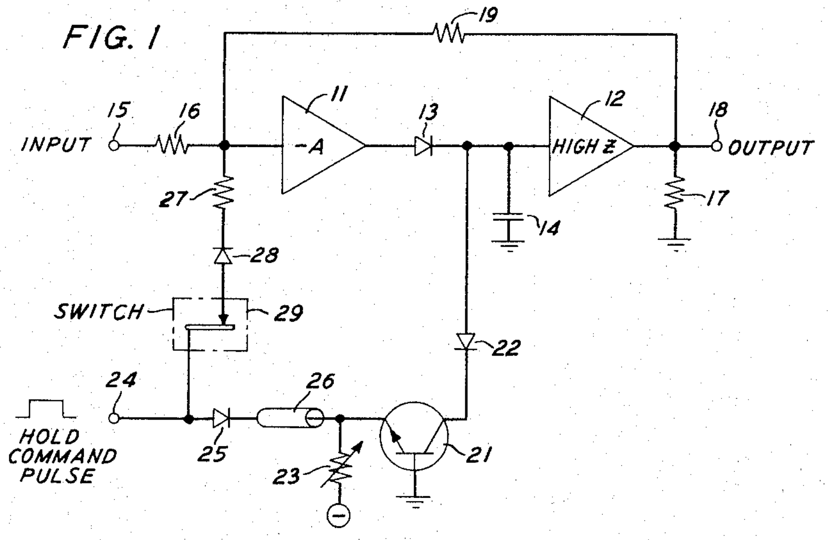
FIG. 1, is a much simplified schematic drawing of a sample and hold circuit constructed in accordance with the present invention.

Referring now to FIG. 1 of the drawings, there is shown a simplified schematic of a sample and hold circuit, in accordance with the invention, comprising an input operational amplifier 11 and a high impedance output buffer 12. The output of the operational amplifier 11 is coupled to the input of the high impedance buffer 12 via a diode-capacitor circuit consisting of diode 13 and capacitor 14.

The input analog signal to be sampled may be of a bipolar nature (i.e., of positive or negative polarity). The analog signal is applied to the input terminal 15 and it is coupled to the input of the operational amplifier 11 via the resistance 16. The operational amplifier 11 is an inverting type amplifier connected such as to have unity gain. Accordingly, the output of the sample and hold circuit is an inverted replica of the input analog signal. The output signal from operational amplifier 11 is coupled via the diode 13 to the sample and hold capacitor 14 and the input to the high impedance buffer is thus derived from the analog signal developed across the capacitor. As will be evident hereinafter, the high impedance buffer 12 can comprise one or more emitter-follower stages. The diode 13 should preferably be of low capacitance with negligible charge-storage effect. There are numerous diodes commercially available which meet these requirements. For example, the "metal hot carrier" diode HPA2001, produced by the Hewlett Packard Co. satisfactorily meets the above requirements.

The output of the buffer 12, developed across output resistance 17, is coupled to the output terminal 18 as well as to the input of the operational amplifier 11 by way of a degenerative feedback path including resistance 19. The feedback is negative or degenerative inasmuch as the operational amplifier 11 produces a phase inversion, whereas the high impedance buffer 12, comprising one or more emitter-follower stages, produces no such phase inversion. The over-all degenerative feedback path assures a linear output signal at terminal 18 even though the diode-capacitor circuit would normally tend to introduce some nonlinearity. The relationship between the input signal $E_i$ and the output signal $E_o$ is given by the following well-known expression, which is a first order approximation $$E_o = -\frac{R_f}{R_i}E_i$$

where $R_f$ is the value of the feedback resistance 19 and $R_i$ is the value of the input resistance 16. It will be apparent from this expression that the output signal $E_o$ is substantially free of any internal nonlinearity that might be introduced into the circuit by nonlinear circuit components, such as diode 13. If the feedback resistance $R_f$ is equal to the input resistance $R_i$, $E_o$ will be equal in magnitude to, and an exact inverted replica of, the input signal $E_i$.

Thus, while operating in the normal sampling mode, the analog output signal is an inverted reproduction of the analog input and, as will be explained in detail hereinafter, when a hold command pulse is applied to the circuit, the output is held at that instantaneous value of the input signal.

The desired holding action is obtained by a transistorized "switch" electrically connected in parallel with the capacitor 14 to normally provide a discharge path for the same. As illustrated in FIG. 1 of the drawings, this switch comprises the transistor 21. Transistor 21 has its base connected directly to ground; its collector connected via diode 22 to the junction of diode 13 and capacitor 14; and, its emitter connected to a source of negative potential via the variable resistance 23. Diode 22 is used to minimize the effect of collector-to-base capacitance of transistor 21. As will be evident to those in the art, the transistor under normal conditions is biased to a state of conduction. While this transistor switch might be expected to introduce some nonlinear effects into the circuit, this in no way affects the linearity of the output signal for the reasons set forth above.

The resistance 23 is adjusted so that the quiescent current through the diode 13 is greater than $Cdv/dt$, where $dv/dt$ is the maximum instantaneous slope of the input signal. Accordingly, with resistance 23 adjusted so that the current through diode 13 always exceeds the maximum instantaneous rate of change of the input current, the circuit functions as an inverting amplifier to provide an output signal which is an inverted reproduction of the bipolar analog signal coupled to input terminal 15.

When holding action is desired, a hold command pulse of positive polarity is generated, by any conventional known pulse generator, and the same is delivered to the input command pulse terminal 24. This hold command pulse is coupled to the emitter of transistor 21 via the isolation diode 25 and a small section of coaxial cable 26. The coaxial cable 26 provides a short delay (approximately 0.5 nanosecond) for reasons which will be apparent hereinafter. The hold command pulse is also coupled to the input of the operational amplifier 11 via resistance 27, diode 28, and the switch 29 symbolically illustrated in FIG. 1 of the drawings. Diode 28 causes the hold-command pulse generator to appear as an open circuit to the amplifier's summing node until such time a holding command pulse is present.

Figure 2:
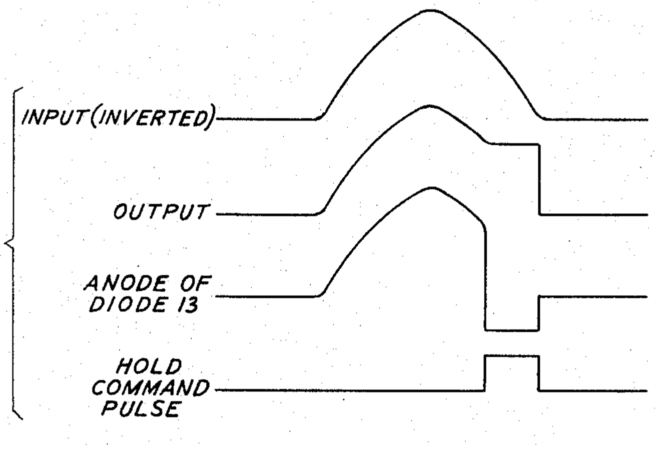
FIGS. 2 and 3 show wave forms useful in the explanation of the two possible modes of operation of the circuit of the present invention.

The holding operation can be best understood by consideration of the waveforms of FIG. 2 in conjunction with the circuit illustrated in FIG. 1. As shown in FIG. 2, the output signal constitutes an inverted replica of the input analog signal until the application of the hold command pulse to terminal 24. The hold command pulse is of positive polarity and therefore when the same is coupled to the emitter of transistor 21 the emitter-base junction is back-biased and the transistor is driven into cut-off. For present purposes, the switch 29 is in a "make" condition and the hold command pulse is thus coupled to the input of the operational amplifier 11 where it is inverted in polarity and then applied to the anode of diode 13 to back-bias the same. Accordingly, during the hold command pulse period the transistor 21 is cut-off and the diode 13 is back-biased. The capacitor 14, having no discharge path except through the high impedance buffer 12, holds the value (i.e., the charge) present at the instant the hold command is applied. The output signal is therefore also held at a corresponding value for the duration of the hold command pulse. When the hold command pulse terminates, the capacitor is once again free to discharge through the transistor 21 and the circuit again operates as an operational amplifier as heretofore described.

As will be clear to those skilled in the art, the above-described sample and hold operation is the same for either polarity of analog input as long as the quiescent current through the diode 13 is capable of exceeding the greatest rate of change of input current.

Figure 3:
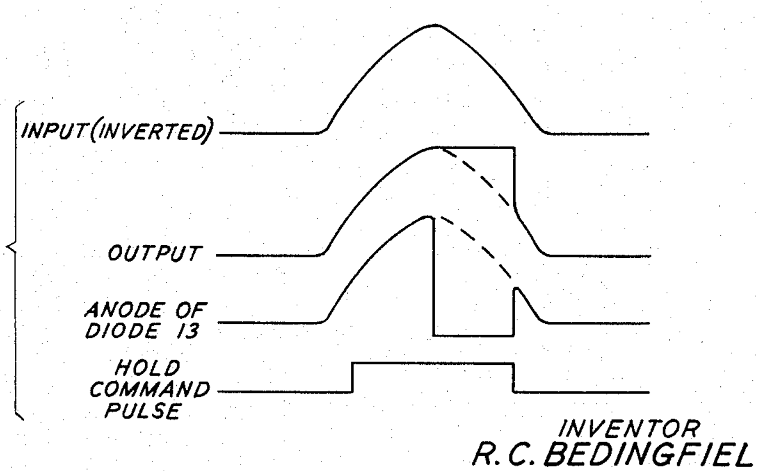

As has been indicated hereinbefore, it is a feature of the present invention that the described circuit embodiment can be utilized to also achieve a peak detection operation. To this end, the switch 29 is opened to prevent the delivery of the hold command pulse to the input of the operational amplifier. The hold command pulse, however, is still applied to the transistor 21 to drive the same into cut-off. In this condition the transistor 21 provides no path for the capacitor to discharge. However, the capacitor is free to charge to the maximum value of the input analog signal, as illustrated in FIG. 3 of the drawing. Once the peak has been reached and the capacitor 14 is charged to this value, the diode 13 is thereafter back-biased. This peak value is retained by the capacitor until the termination of the hold command pulse. Thus, as illustrated by the waveforms shown in FIG. 3, the capacitor samples and holds the maximum value of the input analog signal that occurs during the hold command pulse period.

Figure 4:
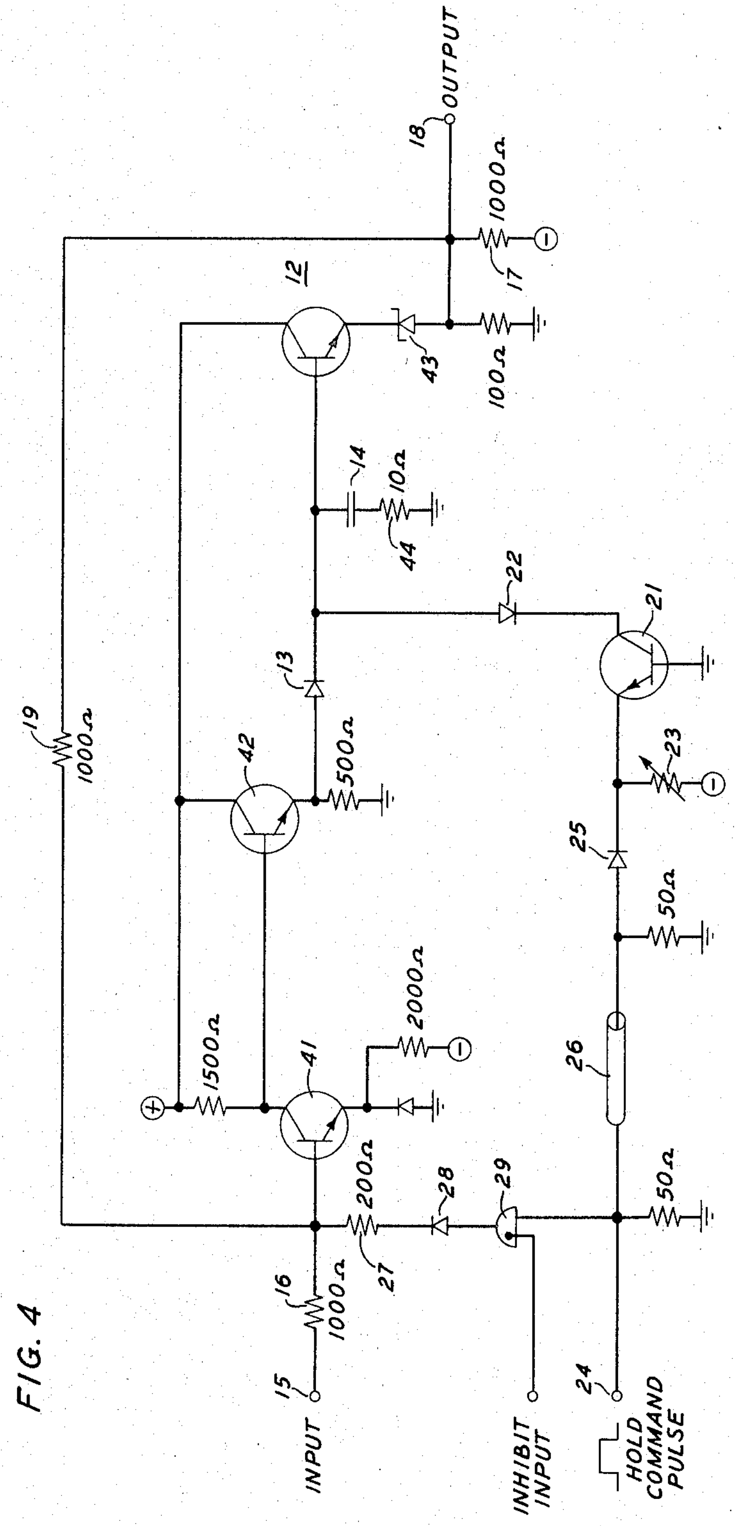
FIG. 4 is a detailed schematic circuit diagram of a transistorized sample and hold circuit according to the invention.

A typical transistorized circuit embodying the principles of the present invention is illustrated in FIG. 4 of the drawings. The aforementioned input operational amplifier is comprised of the transistor 41, connected in a typical common emitter configuration, and transistor 42, connected in emitter-follower fashion so as to provide a high current drive. As further shown in FIG. 4, the high impedance buffer 12 comprises a single emitter-follower stage. Should additional buffering be required, however, the high impedance buffer may comprise several emitter-follower stages connected in tandem. The Zener diode 43 is included so that the output signal may swing negative with respect to ground. The small current limiting resistance 44 is included for purposes of circuit stability.

The resistance 27 should preferably be considerably less than the input resistance 16. This permits the use of a hold command pulse of amplitude substantially less than the input signal amplitude. In a circuit constructed in accordance with the invention, a hold command pulse of one volt in amplitude with a rise time of 3 nanoseconds was used to advantage.

As indicated hereinbefore, the coaxial cable 26 is used to introduce a short delay of approximately 0.5 nanosecond. This is for the purpose of assuring that the transistor 21 cuts off at substantially the same time that the hold command pule causes diode 13 to become back-biased.

As shown in FIG. 4, the symbolic switch 29 of FIG. 1 may comprise a typical INHIBIT gate. For the first described sample and hold operation, this gate simply passes the hold command pulse to the input of the operational amplifier. However, should it be desired to use the circuit for peak detection purposes, an appropriate inhibit signal is coupled to INHIBIT gate 29 so as to block the transmission therethrough of the hold command pulse.

A sample and hold circuit constructed in accordance with the present invention has been designed to operate at a sampling rate of approximately 25 megacycles with a holding time of approximately 20 nanoseconds. The basic circuit is, however, not restricted to this frequency and holding time. By properly selecting circuit components, many combinations of frequency and holding time can be readily realized.

While the transistors employed have been shown and described as n-p-n junction transistors, it is obvious that p-n-p transistors are equally suitable so long as the polarities of the direct current sources and the polarities of the diodes are reversed. It is understood, therefore, that the foregoing disclosure relates to only a preferred embodiment of the invention and that numerous modifications or alterations may be made therein without departing from the spirit and scope of the invention.

What is claimed is:

1. In combination, an operational amplifier to which an analog signal to be sampled may be applied, a high impedance buffer, a diode-capacitor circuit coupled between said operational amplifier and said high impedance buffer, an over-all degenerative feedback path coupling the buffer output to the operational amplifier input, switching means connected in parallel with the capacitor of the diode-capacitor circuit, said switching means normally providing a discharge path for said capacitor so that the output of said high impedance buffer is proportional to the input signal, and means coupling a unipolar hold command pulse of predetermined polarity to said switching means and to the input of said operational amplifier to respectively inhibit the aforementioned discharge path of said capacitor and to back-bias the diode of the diode-capacitor circuit, whereby the capacitor has no discharge path during the hold command pulse period other than that provided by the high impedance buffer.

2. The combination as defined in claim 1 including means for selectively inhibiting the application of the hold command pulse to the input of the operational amplifier.

3. The combination as defined in claim 1 including means for adjusting the quiescent current flow through the diode of said diode-capacitor circuit so that said quiescent current is greater than $Cdv/dt$, where C represents the capacitance of the capacitor and $dv/dt$ is the maximum instantaneous slope of the input analog signal.

4. The combination as defined in claim 1 wherein the hold command pulse is of an amplitude less than that of the input analog signal.

5. An analog signal sample and hold circuit comprising an inverting type amplifier circuit having an input to which an analog signal can be applied, a buffer circuit having high input impedance, a network intercoupling the output of said amplifier circuit and the input of the high impedance buffer circuit, said network including a diode poled to normally pass the output signal current of the amplifier circuit and a capacitor connected in series with said diode, the input to the high impedance buffer being derived from across said capacitor, a negative feedback path coupling the output of the high impedance buffer circuit to the input of the amplifier circuit, transistor switching means connected in parallel with the capacitor for normally providing a discharge path therefor, and means coupling a hold command pulse of predetermined polarity to said switching means and to the input of the amplifier circuit to respectively inhibit the aforementioned discharge path of said capacitor and to back-bias said diode for the duration of the hold command pulse period.

6. An analog signal sample and hold circuit as defined in claim 5 including means for adjusting the quiescent current flow through the diode so that the same is always greater than $Cdv/dt$, where C represents the capacitance of the capacitor and $dv/dt$ is the maximum instantaneous slope of the input analog signal.

7. An analog signal sample and hold circuit as defined in claim 6 including means for selectively inhibiting the application of the hold command pulse to the input of the amplifier circuit.

8. An analog signal sample and hold circuit comprising an inverting type amplifier circuit having an input to which an analog signal can be applied, a buffer circuit having high input impedance, a network intercoupling the output of said amplifier circuit and the input of the high impedance buffer circuit, said network including a diode poled to normally pass the output signal current of the amplifier circuit and a capacitor connected in series with said diode, the input to the high impedance buffer being derived from across said capacitor, a negative feedback path coupling the output of the high impedance buffer circuit to the input of the amplifier circuit, transistor switching means connected in parallel with the capacitor for normally providing a discharge path therefor, and means coupling a hold command pulse of predetermined polarity to said switching means to inhibit the aforementioned discharge path of said capacitor, whereby the capacitor samples and holds the peak value of the input analog signal that occurs during the hold command pulse period.

References Cited

UNITED STATES PATENTS 3,286,101 11/1966 Simon ----------- 328—151 X

ARTHUR GAUSS, *Primary Examiner.*

J. A. JORDAN, *Assistant Examiner.*